US011927902B1

(12) United States Patent
Kojima

(10) Patent No.: US 11,927,902 B1
(45) Date of Patent: Mar. 12, 2024

(54) IMAGE FORMING APPARATUS WITH MAINTENANCE NECESSITY IDENTIFICATION AND PREDICTION

(71) Applicant: TOSHIBA TEC KABUSHIKI KAISHA, Tokyo (JP)

(72) Inventor: Takeshi Kojima, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/896,007

(22) Filed: Aug. 25, 2022

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 15/5016* (2013.01); *G03G 15/5045* (2013.01); *G03G 2215/00772* (2013.01)

(58) Field of Classification Search
CPC .................................................... G03G 15/205
USPC ............................................................ 399/69
See application file for complete search history.

(56) References Cited

U.S. PATENT DOCUMENTS 11,630,405 B1 * 4/2023 Tanaka ................. G03G 15/205 399/69
2011/0222927 A1 9/2011 Yamashina
2021/0364956 A1 11/2021 Usami

FOREIGN PATENT DOCUMENTS

JP 2016144260 A * 8/2016 ......... G03G 15/5004
JP 2020013013 A 1/2020
JP 2020118713 A * 8/2020 ......... G03G 15/2039

* cited by examiner

*Primary Examiner* — Quana Grainger
(74) *Attorney, Agent, or Firm* — Kim & Stewart LLP

(57) ABSTRACT

An image forming apparatus according to one embodiment includes a maintenance management prediction device that predicts and determines the necessity of maintenance for a fixing unit, the type of the required maintenance, and the like by obtaining the difference between initial data (an initial detected temperature and an initial temperature estimation value) and latest data (a latest detected temperature and a latest temperature estimation value) of the fixing unit and comparing the difference to a predetermined range. Based on the comparison of the difference to the predetermined range the prediction device issues or not warning information.

19 Claims, 9 Drawing Sheets

91

IMAGE FORMING APPARATUS WITH MAINTENANCE NECESSITY IDENTIFICATION AND PREDICTION

FIELD

Embodiments described herein relate to an image forming apparatus with maintenance management functions for a fixing unit.

BACKGROUND

An image forming apparatus includes a fixing unit that fixes a toner image onto a recording medium by applying heat and pressure. The fixing unit includes a fixing rotating member (e.g., a heated roller), a pressing member (e.g., a press roller), a heating member (e.g., a lamp, an IH heater, or the like), a temperature sensor, and the like. The temperature sensor detects a surface temperature of the heated roller. A controller that controls the fixing unit controls the surface temperature of the heated roller to a target value by increasing or decreasing, based on a detection signal of the temperature sensor (a temperature sensor signal), an amount of power supplied to the heating member.

In maintenance of the fixing unit, it is usually not known in advance whether the heated roller (or parts thereof) needs to be replaced, and a service/maintenance person typically performs replacement work based on the check of a replacement recommendation counter or, perhaps, upon physical inspection during a routine maintenance visit.

DETAILED DESCRIPTION

Figure 1:
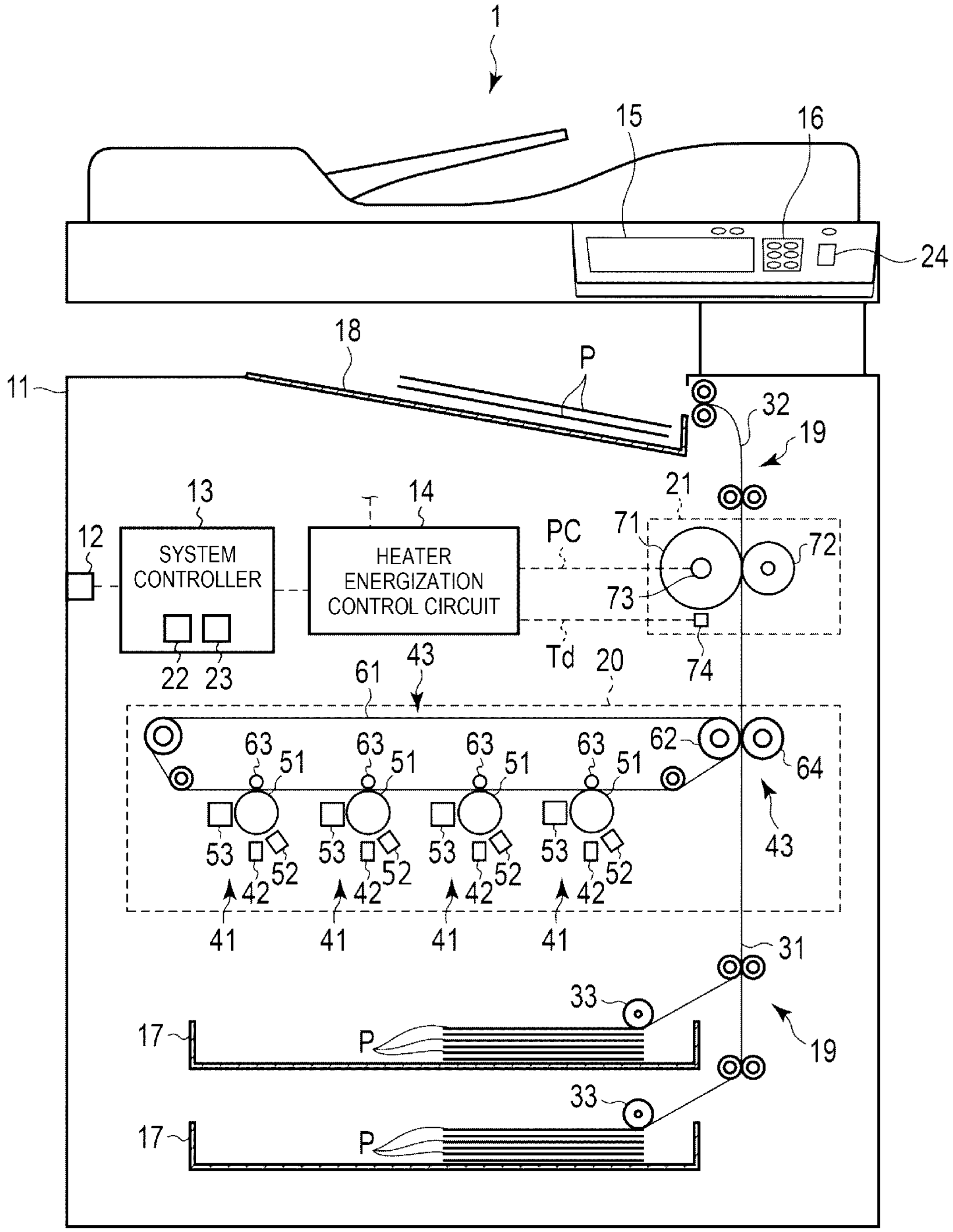
FIG. 1 is a diagram of an image forming apparatus according to an embodiment.

An image forming apparatus according to one embodiment performs, by weighted average control with estimated temperature (WAE) control, temperature control for a mounted fixing unit. The WAE control is to control a temperature of the fixing unit by using a control signal which is obtained by adding a temperature estimation value of the fixing unit obtained by the WAE control during operation and a detected temperature detected by a temperature sensor. WAE control is a technique for simulating a temperature of a member that is a temperature control target serving as a heat RC circuit, and is temperature control using a temperature estimation value of the fixing unit, which is obtained by estimating (calculating) a surface temperature of a heated roller that is a temperature control target based on a heat capacity (C) of the heated roller that is a heating target, a thermal resistance (R) of the fixing unit, input energy to the fixing unit, and the like.

An image forming apparatus according to an embodiment includes a maintenance management prediction device that predicts and determines the necessity of maintenance for the fixing unit, the type of the maintenance, and the like by obtaining the difference between initial data (an initial detected temperature and an initial temperature estimation value) and detection data (a most recently detected temperature and the latest temperature estimation value) and comparing the difference to predetermined ranges set in advance, and displays warning information or the like as needed according to the predetermined ranges.

According to one embodiment, an image forming apparatus includes a processor configured to cause a target component of a fixing unit heated by a heater to reach a target temperature by controlling power supplied to the heater and a temperature sensor configured to detect a temperature of the target component. The image forming apparatus further includes a display unit configured to display information in response to an instruction from the processor. The processor is further configured to estimate a temperature estimation value for the target component based on the detected temperature from the temperature sensor, power supplied to the heater, a heat capacity of the heater, and a thermal resistance of the fixing unit and then control the temperature of the target component by varying the power supplied to the heater based on the estimated temperature estimation value and the target temperature. The processor also acquires a first difference between an initial detected temperature from the temperature sensor at the time of initial energization of the fixing unit and an initial temperature estimation value estimated based on the initial detected temperature and a second difference between a latest detected temperature detected by the temperature sensor and a latest temperature estimation value estimated based on the latest detected temperature. The processor compares a temperature difference between the first difference and the second difference to a predetermined range of difference values to identify either a present necessity or a predicted necessity for maintenance of the fixing unit according to a result of the comparison between the temperature difference and the predetermined range.

Figure 2:
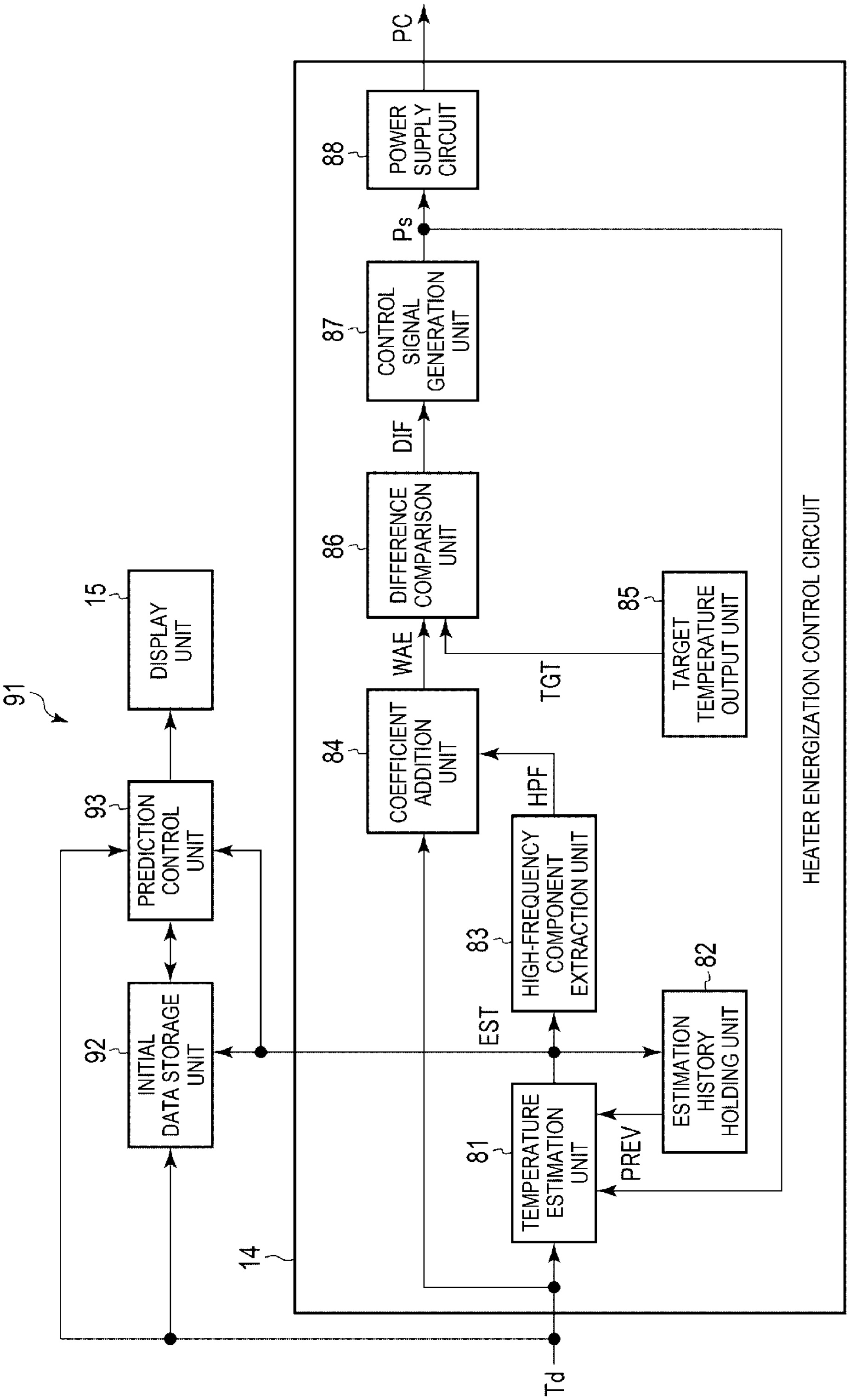
FIG. 2 is a diagram of a maintenance management prediction device and a temperature control device.

Hereinafter, an image forming apparatus according to one example embodiment will be described with reference to drawings. FIG. 1 is a diagram schematically showing an overall configuration example of the image forming apparatus. FIG. 2 is a diagram showing a block configuration of a maintenance management prediction device and a temperature control device provided in the image forming apparatus.

An image forming apparatus 1 is, for example, a multifunction printer (MFP) that performs various processing such as image formation while conveying a recording medium such as a print sheet. Alternatively, the image forming apparatus 1 may be a solid-state scanning printer (for example, an LED printer) that scans an LED array that performs various processing such as image formation while conveying a recording medium. These image forming apparatuses 1 each form an image on the recording medium by, for example, toner received from a toner cartridge. The toner may be toner of a single color, or may be color toner of a plurality of colors such as cyan, magenta, yellow, and black.

The toner may also be decolorable toner that is decolored when heat is applied after printing.

As shown in FIG. 1, the image forming apparatus 1 includes a housing 11, a communication interface 12, a system controller 13, a heater energization control circuit 14, a display unit 15, an operation interface 16, a plurality of sheet trays 17, a sheet discharge tray 18, a conveyance unit 19, an image forming unit 20, a fixing unit 21, and a main power supply switch 24.

The housing 11 is a main body of the image forming apparatus 1. The housing 11 accommodates therein the communication interface 12, the system controller 13, the heater energization control circuit 14, the display unit 15, the operation interface 16, the plurality of sheet trays 17, the sheet discharge tray 18, the conveyance unit 19, the image forming unit 20, and the fixing unit 21.

First, a configuration of a control system of the image forming apparatus 1 will be described.

The communication interface 12 is a connection device that enables communication with other devices such as a host device (an external device). The communication interface 12 includes, for example, a network connection terminal such as a LAN connector. Further, the communication interface 12 may have a function of performing wireless communication with other devices in accordance with a standard such as Bluetooth (registered trademark) or Wi-Fi (registered trademark).

The system controller 13 controls the image forming apparatus 1. The system controller 13 includes, for example, a processor 22 and a memory 23. The processor 22 is, for example, an arithmetic element such as a CPU, executes arithmetic processing, and has a clock function.

As the memory 23, a read-only non-volatile memory, a non-volatile memory allowing writing and reading at any time, and a volatile memory allowing writing and reading at any time can be applied. Examples of the read-only non-volatile memory among these memories include a read only memory (ROM) and the like. Examples of the non-volatile memory allowing writing and reading at any time include a flash ROM, a solid state drive (SSD), a hard disk drive (HDD), and the like. Examples of the volatile memory allowing writing and reading at any time include a random access memory (RAM) and the like. These memories are used in combination as appropriate.

The memory 23 stores a program, data used in the program, and the like. The memory 23 also functions as a working memory. That is, the memory 23 temporarily stores data which is being processed by the processor 22, a program executed by the processor 22, and the like. In the present embodiment, the memory 23 constitutes an initial data storage unit 92 that stores initial data (including an initial detected temperature and an initial temperature estimation value) in a maintenance management prediction device 91.

The processor 22 functions as a control unit capable of executing various operations by executing the program stored in the memory 23. Further, the processor 22 executes various arithmetic processing and processing related to determination by using the data stored in the memory 23. In the present embodiment, a prediction control unit 93 of the maintenance management prediction device 91 is included in the processor 22, and realizes an arithmetic processing function for performing maintenance management and a prediction control function based on a determination function. In addition, the prediction control unit 93 outputs, to the processor 22, information (e.g., an execution date and time and the number of previous executions) related to the maintenance management executed according to a flowchart shown in FIG. 9.

For example, the processor 22 generates a print job based on an image which is acquired from the external device via the communication interface 12. The processor 22 stores the generated print job in the memory 23. The print job includes image data indicating an image formed on a recording medium P. The image data may be data for forming the image on one recording medium P, or may be data for forming the image on a plurality of recording media P. Further, the print job includes information indicating whether the print job is color printing or monochrome printing. Further, the print job may include information such as the number of copies to be printed and the number of pages per copy.

The processor 22 generates, based on the generated print job, print control information for controlling operations of the conveyance unit 19, the image forming unit 20, and the fixing unit 21. The print control information includes information indicating a timing of sheet passing. The processor 22 transmits the print control information to the heater energization control circuit 14.

The processor 22 functions as a controller (an engine controller) that controls the operations of the conveyance unit 19 and the image forming unit 20 by executing the program stored in the memory 23. That is, the processor 22 controls conveyance of the recording medium P by the conveyance unit 19, formation of the image on the recording medium P by the image forming unit 20, and the like.

The image forming apparatus 1 may separately include the engine controller and the system controller 13. In this case, the engine controller controls the conveyance of the recording medium P by the conveyance unit 19, the formation of the image on the recording medium P by the image forming unit 20, and the like. In this case, the system controller 13 supplies the engine controller with information necessary for a control operation.

The image forming apparatus 1 includes a power conversion circuit that supplies a direct-current voltage to each component in the image forming apparatus 1 by using an alternating-current voltage of an alternating-current power supply AC. The power conversion circuit supplies the system controller 13 with a direct-current voltage necessary for operations of the processor 22 and the memory 23. The power conversion circuit supplies the image forming unit 20 with a direct-current voltage necessary for image formation. The power conversion circuit supplies the conveyance unit 19 with a direct-current voltage necessary for conveyance of the recording medium. The power conversion circuit supplies the heater energization control circuit 14 with a direct-current voltage for driving a heater 73 of the fixing unit 21.

The heater energization control circuit 14 generates power PC and supplies the power PC to the heater 73 of the fixing unit 21.

The display unit 15 includes a display that displays a screen in accordance with a video signal input from a display control unit such as the system controller 13 or a graphics controller. For example, the display of the display unit 15 displays a screen for various settings of the image forming apparatus 1. Further, the display unit 15 displays information about necessity of maintenance for the fixing unit 21, the type of maintenance required, and the like, which are estimated or predicted by the prediction control unit 93 of the maintenance management prediction device 91.

The main power supply switch 24 is a switch that supplies and shuts off, by ON and OFF operations, power for driving the image forming apparatus 1. The image forming apparatus 1 is activated by the ON operation of the main power supply switch 24, and driving of the image forming apparatus 1 is stopped by the OFF operation of the main power supply switch 24.

The operation interface 16 is connected to an operation member (user input device). The operation interface 16 supplies the system controller 13 with an operation signal corresponding to an operation of the operation member. The operation member is, for example, a touch sensor, a numeric keypad, a sheet feed key, various function keys, a keyboard, or the like. The touch sensor acquires information indicating a position designated in a certain region. Since the touch sensor is formed as a touch panel integrally with the display unit 15, a signal indicating a touched position on the screen displayed on the display unit 15 is input to the system controller 13.

The plurality of sheet trays 17 are cassettes that are detachably mounted in the housing 11 and that accommodate the recording media P of the same size or different sizes in each cassette unit. The sheet trays 17 each supply the recording medium P to the conveyance unit 19. The sheet discharge tray 18 is a tray that supports the recording medium P discharged from the image forming apparatus 1.

Next, a configuration in which the recording medium P is conveyed in the image forming apparatus 1 will be described.

The conveyance unit 19 is a mechanism that conveys the recording medium P in the image forming apparatus 1. As shown in FIG. 1, the conveyance unit 19 includes a plurality of conveyance paths. For example, the conveyance unit 19 includes a sheet feed conveyance path 31 and a sheet discharge conveyance path 32.

The sheet feed conveyance path 31 and the sheet discharge conveyance path 32 are each implemented by a plurality of motors, a plurality of rollers, and a plurality of guides. The plurality of motors rotate a shaft under control of the system controller 13 to rotate the rollers driven by rotation of the shaft. The plurality of rollers are rotated to move the recording medium P. The plurality of guides prevent skewing and the like of the recording medium P during conveyance.

The sheet feed conveyance path 31 takes in the recording media P one by one from each of the sheet trays 17 by a pickup roller 33, and supplies each of the taken-in recording media P to the image forming unit 20.

The sheet discharge conveyance path 32 is a conveyance path by which the recording medium P on which the image is formed is discharged from the housing 11. The recording medium P discharged by the sheet discharge conveyance path 32 is accommodated in the sheet discharge tray 18.

The image forming unit 20 forms the image on the recording medium P based on the print job generated by the processor 22. The image forming unit 20 includes a plurality of process units 41, a plurality of exposure devices 42, and a transfer mechanism 43. The image forming unit 20 includes one exposure device 42 for each process unit 41. The plurality of process units 41 have the same configuration, and the plurality of exposure devices 42 have the same configuration.

First, the process units 41 will be described.

The process units 41 are connected to the toner cartridge that supplies the toner of different colors, and form a toner image. The plurality of process units 41 are provided for the colors of the toner, and correspond to, for example, color toner of cyan, magenta, yellow, black, and the like. The toner cartridge includes a toner accommodation container and a toner discharge mechanism. The toner accommodation container is a container that supplies the accommodated toner. The toner discharge mechanism is a mechanism implemented by a screw or the like that discharges the toner in the toner accommodation container.

Hereinafter, a set of the process unit 41 and the exposure device 42 will be described as a representative example.

The process unit 41 includes a photosensitive drum 51, a charger 52, and a developing device 53.

The photosensitive drum 51 is a photosensitive member including a cylindrical drum and a photosensitive layer formed on an outer peripheral surface of the drum. The photosensitive drum 51 is rotated at a constant speed by a drive mechanism.

The charger 52 uniformly charges a surface of the photosensitive drum 51. For example, the charger 52 charges the photosensitive drum 51 to a uniform negative potential (a contrast potential) by applying a voltage (a development bias voltage) to the photosensitive drum 51 using a charging roller. The charging roller is driven and rotated by rotation of the photosensitive drum 51 in a state of applying a predetermined pressure to the photosensitive drum 51.

The developing device 53 is a device that adheres the toner to the photosensitive drum 51. The developing device 53 includes a developer container, a stirring mechanism, a developing roller, a doctor blade, an automatic toner control (ATC) sensor, and the like. The developer container is a container that receives and accommodates the toner discharged from the toner cartridge. A carrier is accommodated in the developer container in advance. The toner discharged from the toner cartridge is stirred with the carrier by the stirring mechanism to form a developer in which the toner and the carrier are mixed. The carrier is accommodated in the developer container when the developing device 53 is manufactured.

The developing roller rotates in the developer container to adhere the developer to a surface of the developing roller. The doctor blade is a member disposed at a predetermined interval from the surface of the developing roller. The doctor blade partially removes a top side of the developer that is adhered to the surface of the rotating developing roller. As a result, a layer of the developer having a constant thickness corresponding to the interval between the doctor blade and the surface of the developing roller is formed on the surface of the developing roller.

The ATC sensor is, for example, a magnetic flux sensor that includes a coil and detects a voltage value generated in the coil. A voltage detected by the ATC sensor changes depending on a density of a magnetic flux from the toner in the developer container. That is, the system controller 13 determines, based on the voltage detected by the ATC sensor, a concentration ratio of the toner remaining in the developer container to the carrier (a toner concentration ratio). Based on the toner concentration ratio, the system controller 13 operates a motor that drives the toner discharge mechanism of the toner cartridge, so as to discharge the toner from the toner cartridge to the developer container of the developing device 53.

The exposure device 42 includes a plurality of light emitting elements. The exposure device 42 irradiates the charged photosensitive drum 51 with light from the light emitting elements to form a latent image on the photosensitive drum 51. The light emitting elements are, for example, light emitting diodes (LED) or the like. Each of the light emitting elements is configured to irradiate one point on the photosensitive drum 51 with light. The plurality of light emitting elements are arranged along a main scanning direction that is a direction parallel to a rotation axis of the photosensitive drum 51.

The exposure device 42 irradiates the photosensitive drum 51 with the light by the plurality of light emitting elements arranged in the main scanning direction so as to form a latent image for one line on the photosensitive drum 51. Further, the exposure device 42 continuously irradiates the rotating photosensitive drum 51 with the light to form a latent image of a plurality of lines.

In the process unit 41, when the surface of the photosensitive drum 51 that has been electrostatically charged by the charger 52 is selectively irradiated with the light from the exposure device 42, an electrostatic latent image is formed. When the layer of the developer formed on the surface of the developing roller comes close to the surface of the photosensitive drum 51, the toner contained in the developer is adhered to the latent image on the surface of the photosensitive drum 51. As a result, a toner image is formed on the surface of the photosensitive drum 51.

The transfer mechanism 43 transfers, to the recording medium P, the toner image formed on the surface of the photosensitive drum 51. The transfer mechanism 43 includes, for example, a primary transfer belt 61, a secondary transfer facing roller 62, a plurality of primary transfer rollers 63, and a secondary transfer roller 64.

The primary transfer belt 61 is an endless belt wound around the secondary transfer facing roller 62 and a plurality of winding rollers. An inner surface (an inner peripheral surface) of the primary transfer belt 61 is in contact with the secondary transfer facing roller 62 and the plurality of winding rollers, and an outer surface (an outer peripheral surface) of the primary transfer belt 61 faces the photosensitive drum 51 of the process unit 41.

The secondary transfer facing roller 62 is rotated by a motor. The secondary transfer facing roller 62 is rotated to convey the primary transfer belt 61 in a predetermined conveyance direction. The plurality of winding rollers are freely rotatable. The plurality of winding rollers are rotated by movement of the primary transfer belt 61 caused by the secondary transfer facing roller 62.

Each of the primary transfer rollers 63 brings the primary transfer belt 61 into contact with the photosensitive drum 51 of the process unit 41. Specifically, each of the primary transfer rollers 63 is provided at a position to face the photosensitive drum 51 of a corresponding process unit 41 with the primary transfer belt 61 interposed therebetween. The primary transfer roller 63 is in contact with an inner peripheral surface side of the primary transfer belt 61 and displaces the primary transfer belt 61 toward the photosensitive drum 51. As a result, the primary transfer roller 63 brings the outer peripheral surface of the primary transfer belt 61 into contact with the photosensitive drum 51.

The secondary transfer roller 64 is provided at a position to face the primary transfer belt 61. The secondary transfer roller 64 is in contact with the outer peripheral surface of the primary transfer belt 61 and applies pressure thereto. As a result, a transfer nip is formed in which the secondary transfer roller 64 and the outer peripheral surface of the primary transfer belt 61 are in close contact with each other. When the recording medium P passes through the transfer nip, the secondary transfer roller 64 presses, against the outer peripheral surface of the primary transfer belt 61, the recording medium P passing through the transfer nip.

The secondary transfer roller 64 and the secondary transfer facing roller 62 are rotated to convey the recording medium P therebetween. As a result, the recording medium P passes through the transfer nip.

In the transfer mechanism 43, when the outer peripheral surface of the primary transfer belt 61 is in contact with the photosensitive drum 51, the toner image on the surface of the photosensitive drum is transferred to the outer peripheral surface of the primary transfer belt 61. If the image forming unit 20 includes a plurality of process units 41, the toner image is transferred from the photosensitive drums 51 of each of the process units 41 to the outer peripheral surface of the primary transfer belt 61. The transferred toner image is conveyed by the primary transfer belt 61 to the transfer nip at which the secondary transfer roller 64 and the outer peripheral surface of the primary transfer belt 61 are in close contact with each other. When the recording medium P is present in the transfer nip, the toner image transferred to the outer peripheral surface of the primary transfer belt 61 is transferred to the recording medium P in the transfer nip.

Next, a configuration related to fixing performed by the image forming apparatus 1 will be described.

The fixing unit 21 fixes the toner image onto the recording medium P to which the toner image is transferred. The fixing unit 21 operates under control of the system controller 13 and the heater energization control circuit 14. The fixing unit 21 includes a fixing rotating member, a pressing member, and a heating member. The fixing rotating member that is a temperature control target is a heated roller 71 rotated by a motor. The heated roller 71 is heated by the heater 73. The temperature of the heated roller 71 is controlled by adjusting power supplied to the heater 73. The pressing member is, for example, a press roller 72.

The heated roller 71 includes a metal core formed of metal in a hollow tube shape and an elastic layer formed on an outer periphery of the metal core. An inner side of the metal core of the heated roller 71 is heated by the heater 73 disposed on the inner side of the metal core formed. Heat generated on the inner side of the metal core is transferred to a surface of the heated roller 71 (that is, a surface of the elastic layer) which is outside the metal core.

The press roller 72 is provided at a position to face the heated roller 71. The press roller 72 includes a metal core formed of metal having a predetermined outer diameter, and an elastic layer formed on an outer periphery of the metal core. The press roller 72 applies pressure to the heated roller 71 due to the force applied from a tension member. When the press roller 72 applies the pressure to the heated roller 71, a nip (a fixing nip) is formed at which the press roller 72 and the heat roller 71 are in close contact with each other. The press roller 72 is rotated by a motor. The press roller 72 is rotated to move the recording medium P entering the fixing nip and to press the recording medium P against the heated roller 71.

The heater 73 is a device that generates heat using the power PC supplied from the heater energization control circuit 14. The heater 73 is, for example, a halogen heater (lamp). The halogen heater is supplied with the power PC from the heater energization control circuit 14 to generate an electromagnetic wave (light). The electromagnetic wave is radiated to the inner side of the metal core of the heat roller 71, and thus the heated roller 71 is heated. Alternatively, the heater 73 may be, for example, an IH heater (inductive heater) or the like. Furthermore, the heater 73 is not limited to a configuration in which just one heater element is disposed over an entire heating region inside the heated roller 71, and may be configured such that the heating region can be divided into a plurality of regions and temperatures thereof can be individually adjusted by a plurality of heaters or heater elements. These heating regions can be divided into the same regions corresponding to temperature detection regions of temperature sensors 74. For example, three heaters may be used, and three heaters 73 in total may be disposed at a center (middle) region and both end of the heated roller 71. Of course, the number of heaters 73 is not limited to three.

The fixing unit 21 further includes, for example, a plurality of temperature sensors 74 (for example, thermistors) with, for example, one at the center and one at each of the ends of the heated roller 71 in order to detect a surface temperature of the heat roller 71. Of course, the number and disposition sensor positions (or the temperature detection regions) for the temperature sensors 74 may be determined according to a size of the heated roller 71. In some examples, just one temperature sensor 74 may be provided to measure only one portion, for example, the middle portion of the heated roller 71.

For example, the plurality of temperature sensors 74 may be arranged in parallel with a rotation axis of the heated roller 71. Each of the temperature sensors 74 may be provided at least at a position where a change in the temperature of the heated roller 71 can be detected. The temperature sensors 74 each supply the heater energization control circuit 14 with a temperature detection result Td indicating a detection result (the measured temperature value).

As described above, the heated roller 71 and the press roller 72 of the fixing unit 21 apply heat and pressure to the recording medium P passing through the fixing nip. The toner on the recording medium P is melted by the heat applied from the heated roller 71, and is fused to the surface of the recording medium P by the pressure applied by the heated roller 71 and the press roller 72. As a result, the toner image is fixed on the recording medium P passing through the fixing nip. The recording medium P passing through the fixing nip is introduced into the sheet discharge conveyance path 32 and is discharged to an outside of the housing 11.

Next, the heater energization control circuit 14, which functions as the temperature control device for the heated roller 71, controls the power PC supplied to the heater 73 of the fixing unit 21. The heater energization control circuit 14 generates the power PC and supplies the power PC to the heater 73 of the fixing unit 21. A heat generation amount of the heater 73 is adjusted according to an amount of power of the power PC so that the temperature of the heated roller 71 is controlled.

As shown in FIG. 2, the heater energization control circuit 14 includes a temperature estimation unit 81, an estimation history holding unit 82, a high-frequency component extraction unit 83, a coefficient addition unit 84, a target temperature output unit 85, a difference comparison unit 86, a control signal generation unit 87, and a power supply circuit 88. The temperature detection result Td is input from the temperature sensor 74 to the heater energization control circuit 14. Here, the temperature estimation unit 81, the estimation history holding unit 82, the high-frequency component extraction unit 83, and the coefficient addition unit 84 correspond to a temperature estimation function provided by the processor 22. Further, the target temperature output unit 85, the difference comparison unit 86, the control signal generation unit 87, and the power supply circuit 88 correspond to a temperature control function provided by the processor 22.

The heater energization control circuit 14 adjusts, based on the temperature detection result Td, a temperature estimation history PREV, and an energization pulse Ps, the amount of power supplied to the heater 73 of the fixing unit 21. Such control is referred to as weighted average control with estimated temperature (WAE) control. Each of the temperature estimation unit 81, the estimation history holding unit 82, the high-frequency component extraction unit 83, the coefficient addition unit 84, the target temperature output unit 85, the difference comparison unit 86, and the control signal generation unit 87 of the heater energization control circuit 14 may be implemented by an electric circuit, or may be implemented by software.

The temperature estimation unit 81 performs temperature estimation processing of estimating the surface temperature of the heated roller 71. The temperature estimation unit 81 generates a temperature estimation result (or a temperature estimation value) EST based on the temperature detection result Td, the estimation history PREV, and the energization pulse Ps when the WAE control is started. The temperature estimation unit 81 may be configured to generate the temperature estimation result EST based on the temperature detection result Td, the estimation history PREV, the energization pulse Ps, and a voltage (a rated voltage) applied to the heater 73 when the energization pulse Ps is turned on. The temperature estimation unit 81 outputs the temperature estimation result EST to the estimation history holding unit 82 and the high-frequency component extraction unit 83.

The estimation history holding unit 82 holds a history of the temperature estimation result EST. The estimation history holding unit 82 outputs, to the temperature estimation unit 81, the estimation history PREV that is the history (a past temperature estimation result EST) of the temperature estimation result (or the temperature estimation value) EST.

The high-frequency component extraction unit 83 performs high-pass filter processing of extracting a high-frequency component of the temperature estimation result EST. The high-frequency component extraction unit 83 outputs, to the coefficient addition unit 84, a high-frequency component HPF which is a signal indicating the extracted high-frequency component.

The coefficient addition unit 84 performs coefficient addition processing that is correction of the temperature detection result Td. The temperature detection result Td from the temperature sensor 74 and the high-frequency component HPF from the high-frequency component extraction unit 83 are input to the coefficient addition unit 84. The coefficient addition unit 84 corrects the temperature detection result Td based on the high-frequency component HPF. Specifically, the coefficient addition unit 84 multiplies the high-frequency component HPF by a coefficient set in advance and adds a result to the temperature detection result Td so as to calculate a corrected temperature value WAE. The coefficient addition unit 84 outputs the corrected temperature value WAE to the difference comparison unit 86.

The target temperature output unit 85 outputs, to the difference comparison unit 86, a target temperature TGT set in advance.

The difference comparison unit 86 performs difference calculation processing. The difference comparison unit 86 calculates a difference DIF between the target temperature TGT from the target temperature output unit 85 and the corrected temperature value WAE from the coefficient addition unit 84, and outputs the difference DIF to the control signal generation unit 87.

The control signal generation unit 87 generates, based on the difference DIF, the energization pulse Ps (a pulse signal) which is a control signal for controlling energization to the heater 73. The control signal generation unit 87 outputs the energization pulse Ps to the power supply circuit 88 and the temperature estimation unit 81.

The power supply circuit 88 supplies the power PC to the heater 73 based on the energization pulse Ps. The power supply circuit 88 performs the energization to the heater 73 of the fixing unit 21 by using the direct-current voltage supplied from the power conversion circuit. For example, the power supply circuit 88 supplies the power PC to the heater 73 by switching, based on the energization pulse Ps, between a state in which the direct-current voltage from the power conversion circuit is supplied to the heater 73 and a state in which the direct-current voltage is not supplied to the heater 73. That is, the power supply circuit 88 varies an energization time to the heater 73 of the fixing unit 21 according to the energization pulse Ps.

The power supply circuit 88 may be formed integrally with the fixing unit 21. That is, the heater energization control circuit 14 may be configured to supply the energization pulse Ps to a power supply circuit of the heater 73 of the fixing unit 21 instead of supplying the power PC to the heater 73.

Next, the maintenance management prediction device 91 shown in FIG. 2 will be described.

The maintenance management prediction device 91 includes the temperature sensors 74 (thermistors), the initial data storage unit 92, the prediction control unit 93, and the display unit 15. The prediction control unit 93 corresponds to a prediction control function provided by the processor 22.

As described above, the temperature sensors 74 detect surface temperatures for three different temperature detection regions (center and both ends) of the heated roller 71.

The initial data storage unit 92 uses a part of a storage region of the memory 23. The initial data storage unit 92 associates the initial detected temperature detected by the temperature sensor 74 upon initial energization with the initial temperature estimation value (the temperature estimation result EST) estimated by the temperature estimation unit 83 based on the initial detected temperature and stores the initial detected temperature and the initial temperature estimation value.

The prediction control unit 93 predicts and determines whether maintenance for the fixing unit 21 will be necessary, the type of the maintenance that will be required, and the like by obtaining the difference between the detection data (the latest detected temperature and the latest estimated temperature estimation value) and the initial data (initial detected temperature and the initial temperature estimation value) read out from the initial data storage unit 92, and comparing the difference to the predetermined range set in advance. The prediction control unit 93 is provided by the processor 22, and realizes the arithmetic processing functions for performing the maintenance management and a prediction and determination function. The prediction control unit 93 selects warning information from a plurality of preset pieces of warning information based on the result of prediction and determination, and outputs the selected warning information to the display unit 15. These pieces of warning information may be stored in the memory 23, or may be held in a register or the like provided in the prediction control unit 93.

The display unit 15 displays the warning information indicating the necessity of maintenance (a maintenance time or urgency), the type of maintenance, and the like, which are estimated by the prediction control unit 93.

The maintenance management prediction device 91 of the present embodiment is constructed by using components already present in the image forming apparatus 1, but may be formed in other examples by additionally incorporating components for providing the above described functions.

[WAE Control]

Figure 3:
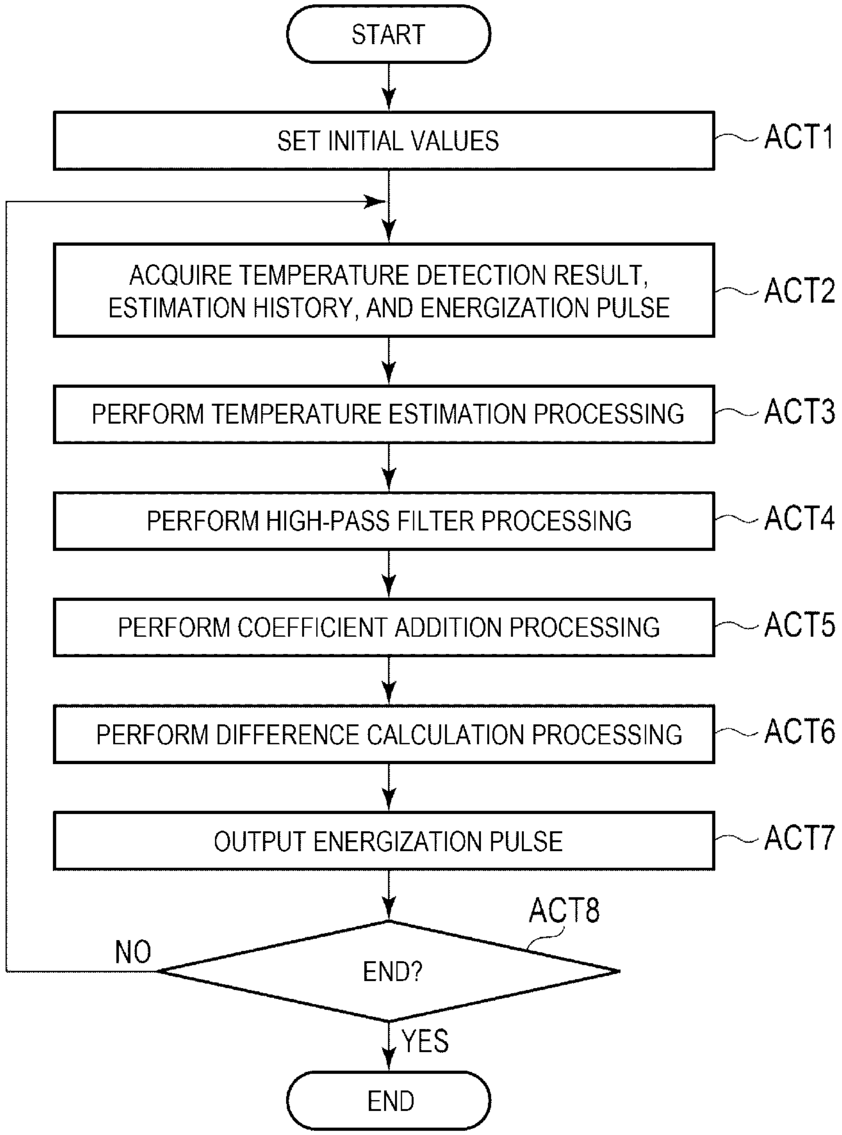
FIG. 3 is a flowchart illustrating weighted average control with estimated temperature (WAE) control.

First, the WAE control performed by the heater energization control circuit 14 will be described with reference to the flowchart shown in FIG. 3. The heater energization control circuit 14 sets various initial values (ACT 1). For example, the heater energization control circuit 14 sets the coefficient in the coefficient addition unit 84, the target temperature TGT from the target temperature output unit 85, and the like based on a signal from the system controller 13.

The temperature estimation unit 81 of the heater energization control circuit 14 acquires the temperature detection result Td from the temperature sensor 74, the estimation history PREV from the estimation history holding unit 82, and the energization pulse Ps which is the control signal from the control signal generation unit 87 (ACT 2).

Next, the temperature estimation unit 81 performs the temperature estimation processing (ACT 3). That is, the temperature estimation unit 81 generates the temperature estimation result EST based on the temperature detection result Td, the estimation history PREV, and the energization pulse Ps. The temperature estimation unit 81 outputs the temperature estimation result EST to the high-frequency component extraction unit 83, the estimation history holding unit 82, the initial data storage unit 92, and the prediction control unit 93. The initial data storage unit 92 stores, under control of the prediction control unit 93 or the processor 22, the initial temperature estimation value (an initial temperature estimation result) which is calculated when the fixing unit 21 is initially energized. In general, a temperature estimation value output thereafter is not stored.

In general, heat transfer can be expressed equivalently by a RC time constant of an electric circuit. Here, heat capacity is replaced with a capacitor C. The resistance of heat transfer is replaced with a resistance R. Further, the heat source is replaced with a direct-current voltage source. The temperature estimation unit 81 estimates an amount of heat applied to the heated roller 71 by applying, to a RC circuit in which values of elements are set in advance, an amount of energization to the heater 73, a heat capacity of the heated roller 71, and the like. The temperature estimation unit 81 estimates the surface temperature of the heated roller 71 based on the amount of heat applied to the heated roller 71, the temperature detection result Td, and the estimation history PREV, and outputs the temperature estimation result (the temperature estimation value) EST.

In the temperature estimation unit 81, energization or shutoff from the direct-current voltage source is repeated based on the energization pulse Ps, and the RC circuit operates according to an input voltage pulse to generate an output voltage. As a result, heat transferred to the surface of the heated roller 71 that is the temperature control target can be estimated. The heat of the heated roller 71 flows out to an external environment through a space in the fixing unit 21 (an outside of the heated roller 71). Therefore, the temperature estimation unit 81 further includes a RC circuit that estimates outflow of the heat from the heated roller 71 to the external environment. The temperature estimation unit 81 may further include a RC circuit that estimates an amount of heat flowing from the heated roller 71 to the space in the fixing unit 21.

The high-frequency component extraction unit 83 performs the high-pass filter processing of extracting the high-frequency component of the temperature estimation result EST (ACT 4). The high-frequency component HPF, which is the signal indicating the high-frequency component of the temperature estimation result EST, follows a change in an actual surface temperature of the heated roller 71.

Next, the coefficient addition unit 84 performs the coefficient addition processing that is the correction of the temperature detection result Td (ACT 5). The coefficient addition unit 84 multiplies the high-frequency component HPF by the coefficient set in advance and adds the high-frequency component HPF multiplied by the coefficient to the temperature detection result Td so as to calculate the corrected temperature value WAE.

The coefficient addition unit 84 adjusts, with the coefficient, a value of the high-frequency component HPF to be added to the temperature detection result Td, so as to calculate the corrected temperature value WAE. For example, when the coefficient is 1, the coefficient addition unit 84 directly adds the high-frequency component HPF to the temperature detection result Td. For example, when the coefficient is 0.1, the coefficient addition unit 84 adds a value of one tenth of the high-frequency component HPF to the temperature detection result Td. In this case, an effect of the high-frequency component HPF is almost eliminated, and the corrected temperature value WAE is close to the temperature detection result Td. Further, for example, when the coefficient is 1 or more, the effect of the high-frequency component HPF can be more strongly expressed. Experiment shows that the coefficient set in the coefficient addition unit 84 is not a very extreme value and is preferably a value close to 1.

In the WAE control, fine (high frequency) changes in the surface temperature of the heated roller 71 are estimated based on the temperature detection result Td and the high-frequency component HPF of the temperature estimation result EST. The corrected temperature value WAE may more closely follow the surface temperature of the heated roller 71.

The difference comparison unit 86 calculates the difference DIF between the target temperature TGT (from the target temperature output unit 85) and the corrected temperature value WAE (from the coefficient addition unit 84), and outputs the difference DIF to the control signal generation unit 87 (ACT 6).

The control signal generation unit 87 generates the energization pulse Ps based on the difference DIF. The control signal generation unit 87 outputs, to the power supply circuit 88 and the temperature estimation unit 81, the energization pulse Ps which is the control signal (ACT 7). The power supply circuit 88 supplies the power PC to the heater 73 based on the energization pulse Ps.

The difference DIF indicates a relationship between the target temperature TGT and the corrected temperature value WAE. For example, when the corrected temperature value WAE is larger than the target temperature TGT, control is performed such as narrowing a width of the energization pulse Ps or reducing a frequency of the energization pulse Ps, and thus the amount of energization to the heater 73 is reduced and the surface temperature of the heated roller is lowered. When the corrected temperature value WAE is smaller than the target temperature TGT, control is performed such as widening the width of the energization pulse Ps or increasing the frequency of the energization pulse Ps, and thus the amount of energization to the heater 73 is increased and the surface temperature of the heated roller rises.

From the difference DIF, it is possible to grasp not only a magnitude relationship between the corrected temperature value WAE and the target temperature TGT, but also a deviation between the corrected temperature value WAE and the target temperature TGT. For example, when an absolute value of the difference DIF is a large value, the deviation between the corrected temperature value WAE and the target temperature TGT is large, and thus the width of the energization pulse Ps may be largely changed. For example, when the absolute value of the difference DIF is a small value, the deviation between the corrected temperature value WAE and the target temperature TGT is small, and thus the width of the energization pulse Ps may be controlled gently.

The processor 22 of the system controller 13 determines whether the WAE control ends (ACT 8). If the processor 22 determines in ACT 8 that the WAE control is continued without ending (NO in ACT 8), the processing proceeds to processing of ACT 2. On the other hand, if the processor 22 determines that the WAE control ends (YES in ACT 8), the processor 22 ends a processing routine.

As described above, when the heater energization control circuit 14 performs processing for one cycle (a current cycle), the heater energization control circuit 14 performs the WAE control based on a value (the energization pulse Ps and the temperature estimation result EST: the estimation history PREV) in a previous cycle and the temperature detection result Td in the current cycle. That is, the heater energization control circuit 14 inherits the value in a next cycle. The heater energization control circuit 14 re-performs temperature estimation and calculation based on a history of a previous calculation. Therefore, the heater energization control circuit 14 always performs calculation during the operation. In the heater energization control circuit 14, a calculation result is held in a memory or the like and reused in calculation in the next cycle.

By such WAE control, an influence of detection delay can be reduced, and a phenomenon in which an overshoot or a temperature ripple is increased can be prevented.

Next, the change in the surface temperature of the heated roller 71 when a temperature abnormality occurs will be described with reference to FIGS. 4 and 5. FIG. 6 is a diagram showing a relationship between a thickness of foreign matter sandwiched between the temperature sensor 74 (thermistors) and the heated roller 71 and an actual temperature detected for the heated roller 71.

Figure 4:
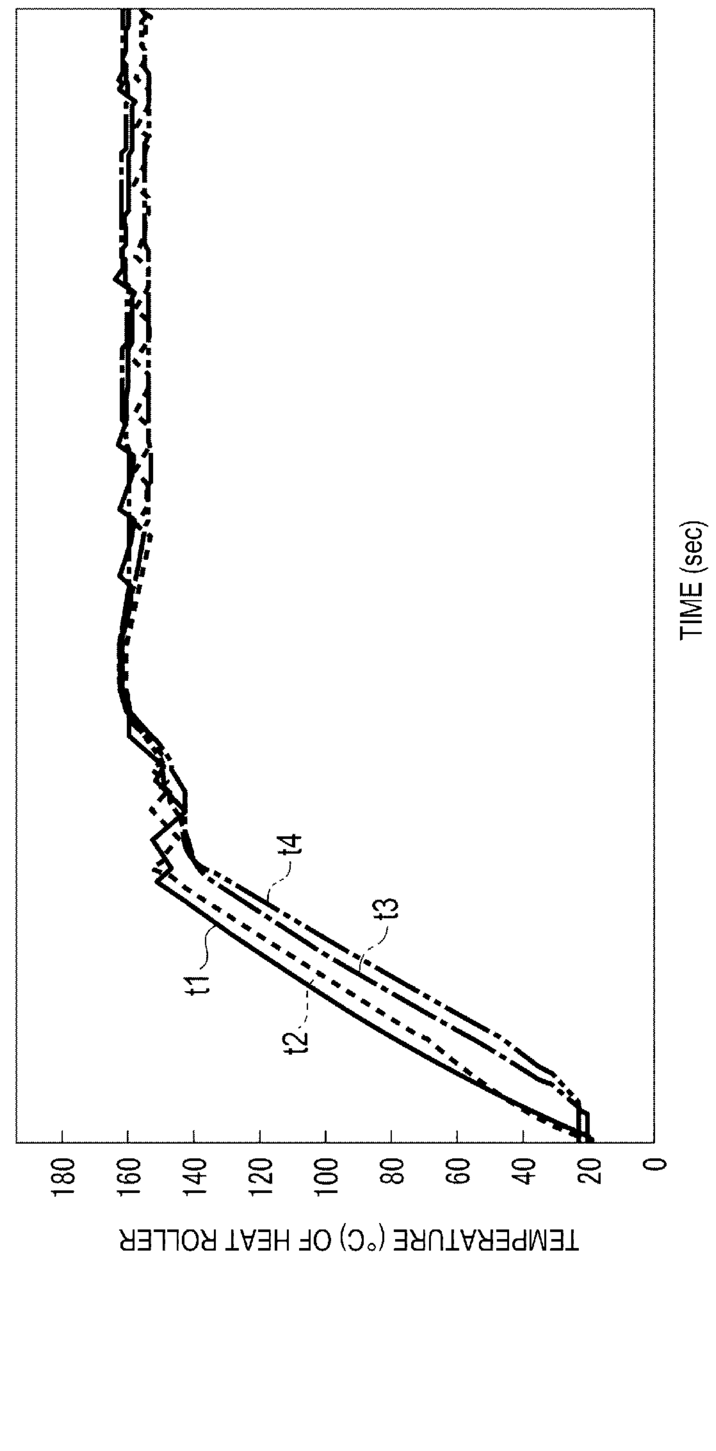
FIG. 4 is a graph showing a change in a surface temperature of a heated roller in a normal state.

FIG. 4 is a temperature characteristic diagram showing the change in the surface temperature of the heated roller 71 when the heated roller 71 is in a normal state. FIG. 5 is a temperature characteristic diagram showing the change in the surface temperature of the heated roller 71 when the heated roller 71 is in an abnormal state. It is assumed that the abnormality in this example is caused by foreign matter on the heated roller 71 or dirt (e.g., toner) on the heated roller 71 or the thermistors 74. Here, in the present example, thermistors 74 are provided near the midpoint along the axial length of the cylindrical heated roller 71 and near one of the ends of the heated roller 71.

Figure 5:
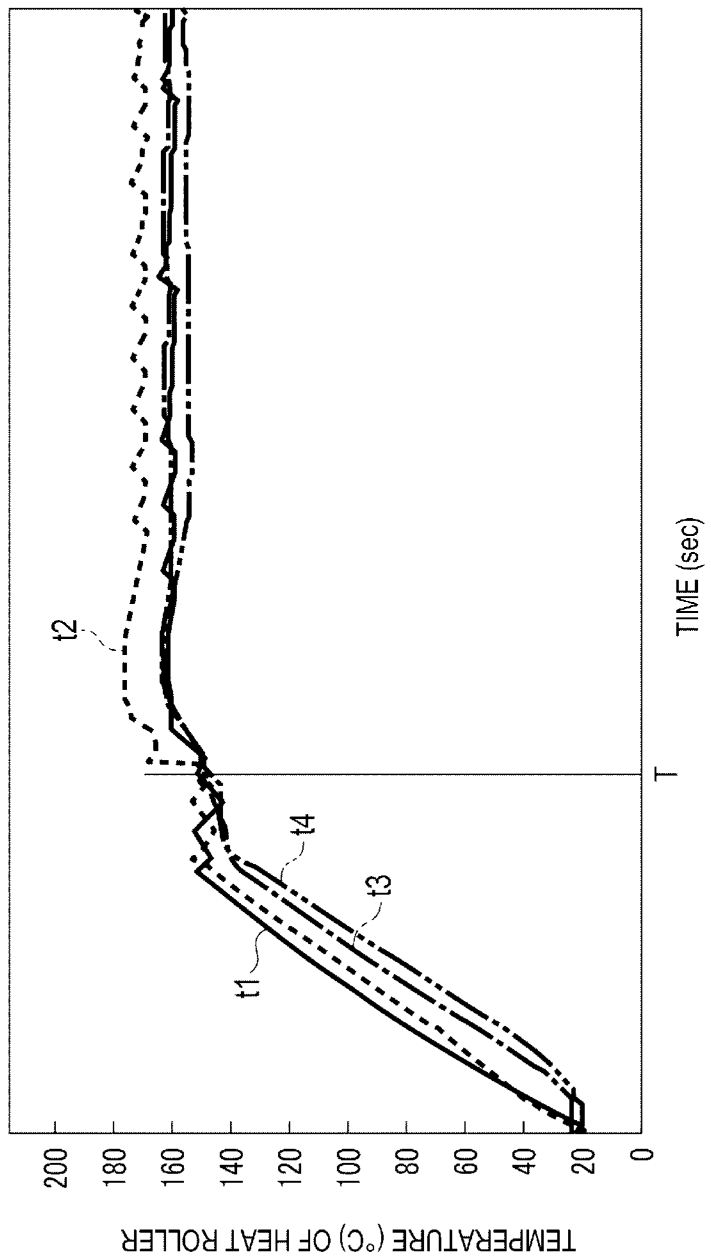
FIG. 5 is a graph showing a change in a surface temperature of a heated roller in a temperature abnormality state.
Figure 6:
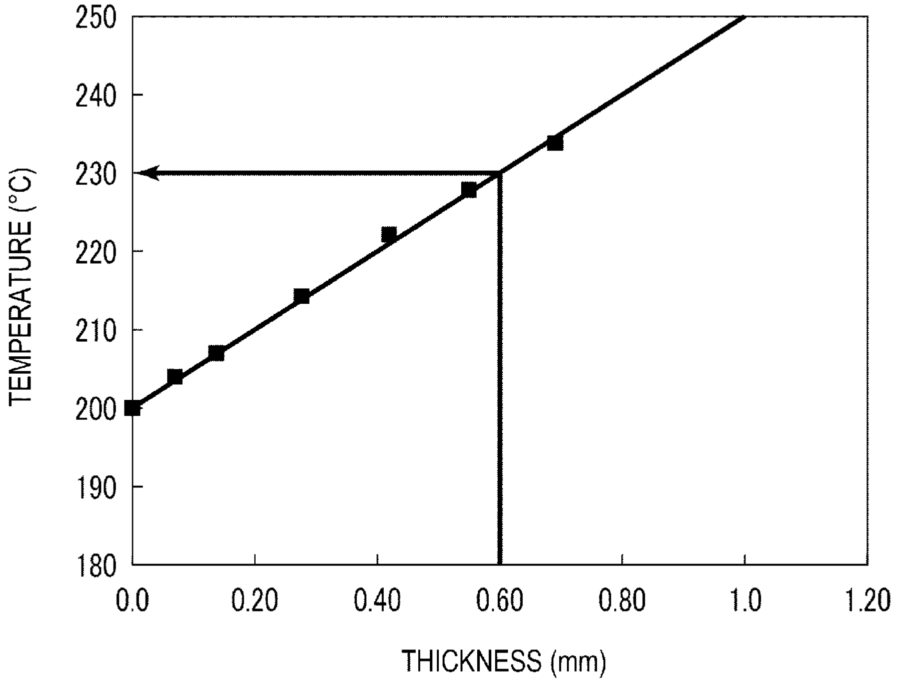
FIG. 6 is a graph showing a relationship between a thickness of a sandwiched foreign matter and an actual temperature of a heated roller.

As temperature characteristics shown in FIGS. 4 and 5, a vertical axis indicates the surface temperature (° C.) of the heated roller 71, and a horizontal axis indicates a time (sec). Further, plotted temperatures indicate a center correction temperature estimation value (hereinafter, referred to as a center temperature estimation value) t1, a side correction temperature estimation value (hereinafter, referred to as a side temperature estimation value) t2, a center thermistor detected temperature (hereinafter, referred to as a center detected temperature) t3, and a side thermistor detected temperature (hereinafter, referred to as a side detected temperature) t4.

Figure 7:
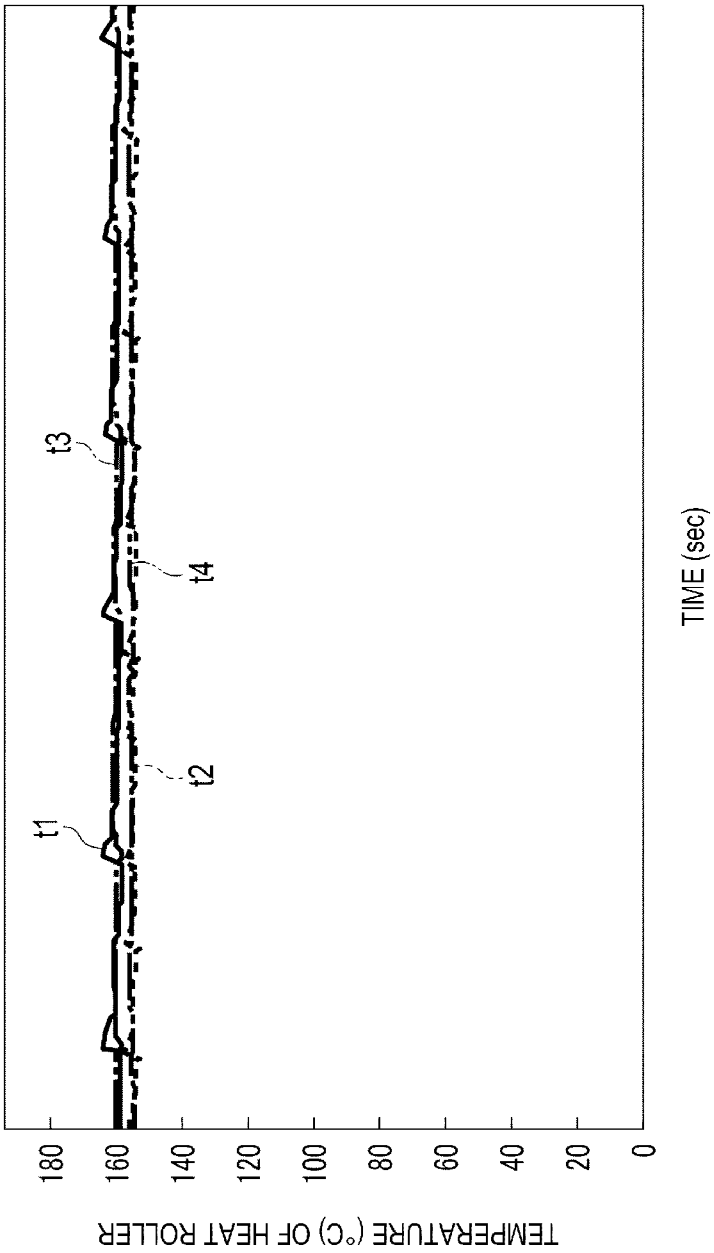
FIG. 7 is a graph showing a surface temperature of a heated roller in a normal state.

In FIG. 4, the center detected temperature t3 and the side detected temperature t4 rise at the same slope, and stay at substantially the same constant temperatures after reaching a target temperature. Based on the center detected temperature t3 and the side detected temperature t4, the center temperature estimation value t1 and the side temperature estimation value t2 are estimated. As shown in FIG. 7, in the normal state, the center temperature estimation value t1, the side temperature estimation value t2, the center detected temperature t3, and the side detected temperature t4 stay at about 160° C. which is the target temperature, with substantially the same amplitude.

FIG. 6 is the diagram showing temperature characteristics of the thickness of the foreign matter sandwiched between a temperature sensor 74 (an end thermistor) and the heated roller 71 in a test, and the actual temperature detected from the heated roller 71. To simulate foreign matter, spacers having different thicknesses were fitted. As the thickness of the spacer increases, more heat transfer to the temperature sensor 74 (the end thermistor) from the heated roller 71 is blocked. For example, when a control temperature of the heated roller 71 is set to a target temperature of 200° C. (the target temperature TGT) and no spacer is present (e.g., 0 mm spacer thickness), the temperature detected by the temperature sensor 74 and the actual temperature of the heated roller 71 are substantially the same temperature of 200° C.

In FIG. 6, a spacer of 0.60 mm is sandwiched between the temperature sensor 74 and the heated roller 71.

Since the heat transfer is blocked to some extent by the spacer, the temperature sensor 74 detects a temperature lower than the actual temperature. Therefore, by the WAE control, the heater 73 supplies additional heat to the heated roller 71 such that the temperature detected by the temperature sensor 74 will reach the target temperature of 200° C. As a result, the temperature detected by temperature sensor 74 will be 200° C., but as shown by an arrow, the actual temperature of the heated roller 71 rises to 230° C. That is, the power supply circuit 88 supplies the power PC to the heater 73 based on the energization pulse Ps. When a state in which the corrected temperature value WAE is smaller than the target temperature TGT occurs, the control is performed such as widening the width of the energization pulse Ps or increasing a frequency at which the heater 73 is turned on, and thus the amount of energization to the heater 73 is increased and the surface temperature of the heated roller 71 rises. When the frequency at which the heater 73 is turned on is increased, the temperature estimation value in the WAE control becomes high, and a deviation from the detected temperature detected by the temperature sensor 74 is increased.

FIG. 5 shows the temperature when the sandwiching of the foreign matter or the adhesion of the dirt occurs between the temperature sensor 74 and the heated roller 71.

Similarly to the normal state, the center detected temperature t3 and the side detected temperature t4 rise at the same slope. When the sandwiching of the foreign matter or the adhesion of the dirt occurs between the side thermistor 74 and the heated roller 71 at a timing of a time T shown in FIG. 5, the side detected temperature t4 is obtained by detecting the temperature of the heated roller 71 in a state in which the foreign matter is interposed. Therefore, a temperature lower than an original temperature is detected.

Figure 8:
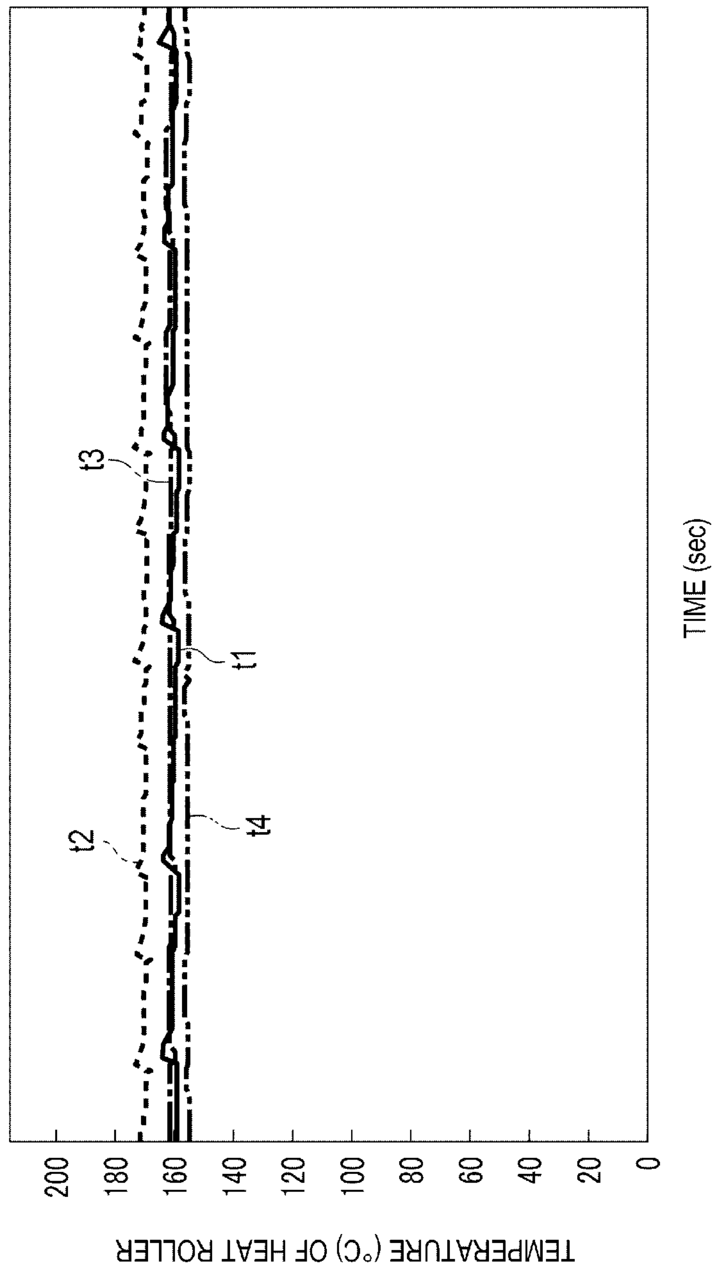
FIG. 8 is a graph showing a surface temperature of a heated roller in a temperature abnormality state.

Therefore, by the WAE control, the temperature of the heated roller 71 on a side thermistor 74 side is further heated by the heater 73. Therefore, apparently, the side detected temperature t4 stays at the same detected temperature as the center detected temperature t3. However, when the sandwiching of the foreign matter or the adhesion of the dirt occurs and the frequency at which the heater 73 is turned on is increased, the side temperature estimation value t2 in the WAE control becomes high as shown in FIG. 8.

In the example, the side temperature estimation value t2 stays at a temperature higher than the center temperature estimation value t1 by about 10° C. or higher. In the present embodiment, whether such a change in the temperature (temperature deviation) occurs is used to determine whether the sandwiching of the foreign matter or the adhesion of the dirt occurs between the thermistor 74 and the heated roller 71.

For example, a normal detected temperature and a normal temperature estimation value of the heated roller 71 in a standby state or a printing state when initial operation is started, or a difference (referred to as a first difference) between the normal detected temperature and the normal temperature estimation value are stored in advance as a determination criterion. Thereafter, when the image forming apparatus 1 is activated by being powered on or recovers from a sleep state, a difference (referred to as a second difference) between the detected temperature of the heated roller 71 and the temperature estimation value in the WAE control is acquired, and the first difference is compared with the second difference. For a given comparison result (a temperature difference), the necessity of maintenance, the maintenance time, and the type of the maintenance can be determined based on the predetermined range set in advance. As an example of the predetermined range, ranges can be set in which determination of "normal" is made when the temperature estimation value (the temperature difference) is less than 10° C., "warning about an abnormality" notice is issued when the temperature difference is 10° C. or higher but less than 20° C., and "a request instruction for a maintenance service" notice is issued when the temperature difference is 20° C. or higher. Here, a first predetermined range is 10° C.≤temperature difference <20° C. and a second predetermined range is 20° C.≤temperature difference. Of course, predetermined ranges can be changed as appropriate. Here, the two predetermined ranges are described as an example, but the number of the predetermined ranges is of course not limited to two and can be set as appropriate.

Figure 9:
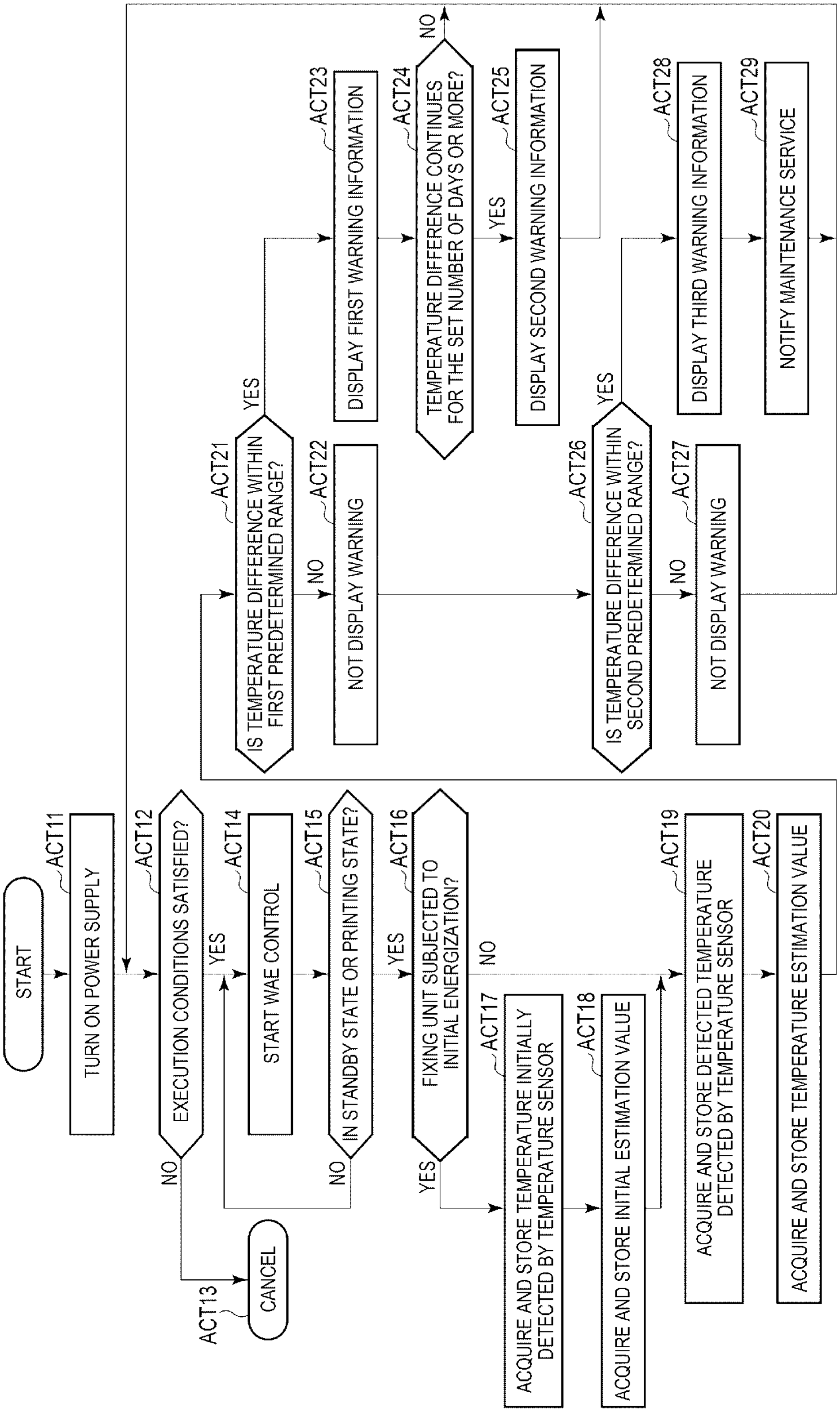
FIG. 9 is a flowchart illustrating a determination of a necessity of maintenance, a type of the maintenance, and a warning display.

Next, the determinations regarding the necessity of maintenance for the fixing unit 21, the type of the maintenance required, and the like, and whether a warning display is to be made, which are performed by the maintenance management prediction device 91 and the heater energization control circuit 14 (a temperature control device) in the present embodiment, will be described with reference to the flowchart shown in FIG. 9.

First, the image forming apparatus 1 in a stopped state is activated by the ON operation of the main power supply switch 24 (ACT 11). Alternatively, by touching any of the keys, the image forming apparatus 1 in the sleep state is recovered and activated again. Supply of driving power to the respective components in the apparatus is started by the activation and the activation again.

After the activation, it is confirmed whether certain execution conditions for performing the determinations of the necessity of maintenance for the fixing unit 21, the type of the maintenance, and the like, and the necessity for issuing a warning display are presently satisfied (ACT 12).

Here, the following are set as execution conditions:

1. The initial data storage unit 92 is initialized. Alternatively, the initial data is already stored in the initial data storage unit 92.

2. The determination regarding the necessity of maintenance (and the type of the maintenance) and the necessity of a warning are executed every time the image forming apparatus is activated, once a day, or at some interval set based on the number of activations.

3. An input voltage of power supplied to the image forming apparatus 1 is within or outside an allowable range.

The initial data storage unit 92 is initialized by erasing the initial data when replacement of the fixing unit 21 (or replacement of a component related to heat in the fixing unit 21) is performed.

Furthermore, a routine for performing the maintenance management by the maintenance management prediction device of the present embodiment may be performed every time the image forming apparatus is activated, or may be set so as to be performed only once per day (upon activation or at a fixed time), or the like. If the execution is set for once per day (or the like), and an execution has already occurred during the day (thus corresponding to the execution conditions not being satisfied (NO in ACT 12)), the prediction control unit 93 cancels execution of the routine for performing the maintenance management (ACT 13), and transitions to a normal operation state. A manual execution method may be selectable as appropriate by, for example, creating an activation program for the processor 22.

Further, the system controller 13 determines whether the input voltage of the power supplied to the image forming apparatus 1 is within the allowable range. In the example, it is determined whether the input voltage is within a rated voltage ±5% set as the allowable range. For example, if the input voltage is 100 V, the allowable range is a range of 95 V to 105 V. The detected temperature detected by the temperature sensor (the thermistor) 74 and the initial temperature estimation value estimated by the temperature estimation unit 81 are affected by the input voltage of the power supplied to the image forming apparatus 1. Therefore, the allowable range is set such that the initial data including an appropriate initial detected temperature and an appropriate initial temperature estimation value which are the appropriate determination criteria can be obtained. Of course, setting of the allowable range can be changed as appropriate.

If the input voltage of the power is outside the allowable range in ACT 12, it is determined that the execution conditions are not satisfied (NO in ACT 12), and the processing proceeds to ACT 13. In ACT 13, the prediction control unit 93 cancels the execution of the routine for performing the maintenance management, and transitions to the normal operation state.

On the other hand, if the execution conditions 1 to 3 are satisfied in ACT 12 (YES in ACT 12), the heater energization control circuit 14 starts the above WAE control (ACT 14).

First, by performing the above WAE control, the heated roller 71 is heated by the heater 73 of the fixing unit 21 to the target temperature TGT set for the heated roller 71, as shown in FIG. 4. It is determined whether the image forming apparatus 1 is in a standby state or a printing state (ACT 15). The heated roller 71 is subjected to the temperature control in the operation standby state (during operation standby) or the printing state so as to maintain the target temperature TGT. That is, a time when the initial data is acquired is preferably a time in the operation state (during operation) in which the heated roller 71 is subjected to the temperature control, and thus it is determined whether the image forming apparatus 1 is in the standby state to wait for an instruction at the start of printing, or in the printing state.

If the image forming apparatus 1 is not in the standby state or the printing state in ACT 15 (NO in ACT 15), the processing returns to ACT 14, and the maintenance management prediction device 91 stands by for start of a maintenance management prediction routine until the image forming apparatus 1 is in the standby state or the printing state. On the other hand, if the image forming apparatus 1 is in the standby state or the printing state (YES in ACT 15), it is determined whether the fixing unit 21 is subjected to the initial energization based on whether the initial data storage unit 92 is initialized (ACT 16). That is, the initial data is acquired when the unused image forming apparatus 1 is powered on and activated for the first time, or when replacement of the fixing unit 21 (or a replacement of any component related to heat) has been performed by maintenance or the like.

If it is determined in ACT 16 that the initial energization is performed (YES in ACT 16), the initial detected temperature detected by the temperature sensor 74 is acquired and stored in the initial data storage unit 92 (ACT 17). Subsequently, the initial temperature estimation value in the WAE control is acquired from the temperature estimation unit 81 and stored in the initial data storage unit 92 (ACT 18). In this way, the initial detected temperature and the initial temperature estimation value are stored as the initial data in the initial data storage unit 92, and the processing proceeds to ACT 19. As the initial data, the initial detected temperature and the initial temperature estimation value may be directly stored, or a difference obtained by subtracting the initial temperature estimation value from the initial detected temperature may be stored. The stored initial data is erased and initialized in response to an instruction from the prediction control unit 93 when the replacement of the fixing unit 21 or the replacement of the component related to the heat in the fixing unit 21 is performed.

If it is determined in ACT 16 that the initial energization is not performed (NO in ACT 16), the processing proceeds to ACT 19.

In ACT 19, the latest (most recent) detected temperature detected by the temperature sensor 74 is acquired and output to the prediction control unit 93. Subsequently, the latest temperature estimation value in the WAE control is acquired from the temperature estimation unit 81 and is output to the prediction control unit 93 (ACT 20). The latest detected temperature and the latest temperature estimation value are used as the detection data.

Next, the prediction control unit 93 calculates the temperature difference between the first difference of the initial data read out from the initial data storage unit 92 and the second difference of the detection data, and determines whether the temperature difference is within the predetermined range set in advance (ACT 21).

First, in order to obtain the temperature difference, in the initial data, (the initial temperature estimation value)−(the initial detected temperature)=the first difference of the initial data is obtained.

In the detection data, (the latest temperature estimation value)−(the latest detected temperature)=the second difference of the detection data is obtained.

(The second difference of the detection data)—(the first difference of the initial data)=the temperature difference is calculated.

In ACT 21, it is determined whether the temperature difference is within the first predetermined range (10° C.≤the temperature difference <20° C.). If it is determined in ACT 21 that the temperature difference is not within the first predetermined range (NO in ACT 21), no warning is displayed on the display unit 15 (ACT 22), and the processing proceeds to determination in ACT 26. Although the warning is not displayed here, it is not determined that no abnormality due to the foreign matter or the dirt occurs.

On the other hand, if it is determined in ACT 21 that the temperature difference is within the first predetermined range (10° C.≤temperature difference <20° C.), it is determined that the temperature abnormality occurs (YES in ACT 21), and first warning information is displayed on the display unit 15 as a maintenance management result (ACT 23). The temperature abnormality in the first predetermined range is a determination that the sandwiching of foreign matter or dirt occurs between the heated roller 71 and the thermistor 74. As the displayed first warning information, for example, "warning: the temperature abnormality due to the foreign matter or the dirt occurs. Please confirm the heated roller. An error number XXX" is displayed.

Next, after the first warning information is displayed in ACT 23, the prediction control unit 93 refers to counter or clock information of the system controller 13 to determine the number of times the temperature abnormality was determined in the ACT 21 or whether display of the first warning information in ACT 23 has continued for the set number of days or more (ACT 24).

Here, the number of days is set to, for example, ten days. Thus, if the determination of the temperature abnormality or the display of the first warning information continues for more than ten days (YES in ACT 24), it is determined that the temperature abnormality continues, and second warning information is displayed on the display unit 15 as the maintenance management result (ACT 25). After the second warning information is displayed, the processing returns to ACT 12.

As the second warning information, for example, "warning: the temperature abnormality continues. Please execute the maintenance within several days. An error number YYY" is displayed. The second warning information does not indicate that a failure immediately occurs, but is a maintenance request to predict that the failure occurs in the near future if the maintenance of the fixing unit 21 is not executed.

Next, if it is determined in ACT 21 that the temperature difference is outside the first predetermined range (NO in ACT 21), two determination results, that is, a determination result of the temperature difference of 10° C. or lower (the temperature difference ≤10° C.) and a determination result of the temperature difference of 20° C. or higher (the temperature difference 20° C.) are generated.

In ACT 26, it is determined whether the temperature difference is within the second predetermined range (20° C.≤the temperature difference), that is, whether the temperature difference is 20° C. or higher. If it is determined in ACT 26 that the temperature difference is less than 20° C. (NO in ACT 26), the temperature difference is 10° C. or lower (the temperature difference ≤10° C.), and it is determined that the image forming apparatus 1 operates normally without the temperature abnormality. Since the image forming apparatus 1 is determined to be normal, no warning is displayed (ACT 27), and the processing returns to ACT 12.

Further, if it is determined in ACT 26 that the temperature difference is 20° C. or higher (YES in ACT 26), it is determined that an abnormality other than a sandwiching of foreign matter or dirt occurs requires maintenance work or replacement work performed by a maintenance operator, and third warning information is displayed on the display unit 15 as the maintenance management result (ACT 28). As the third warning information, for example, "warning: the temperature abnormality occurs. Please stop the apparatus and contact the maintenance service. An error number ZZZ" is displayed.

Further, after the third warning information is displayed, the prediction control unit 93 notifies the maintenance service to request a visit for maintenance through the processor 22 (ACT 29). Of course, a user may also or instead directly request maintenance service from a maintenance management department or the like.

In addition, an image forming apparatus 1 of an embodiment can be communicably connected, via a network such as the Internet, to an external device such as a personal computer in a workplace, home, or a local agency, and can execute printing and maintenance management by a remote operation from the personal computer. The warning information regarding a maintenance management request, warning, or prediction can also be displayed on the personal computer.

As described above, according to an embodiment, the abnormal state and the prediction are specifically displayed for a temperature abnormality of the fixing unit, and thus it is possible to determine whether to perform maintenance work that might be handled by a regular user or maintenance/replacement work that might require a service person. Further, since a prediction of maintenance and replacement work to be handled by a service person is displayed in advance, the image forming apparatus 1 can be used in an efficient, planned manner since service visits can be scheduled for less disruptive times.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a processor configured to cause a target component of a fixing unit heated by a heater to reach a target temperature by controlling power supplied to the heater;

a temperature sensor configured to detect a temperature of the target component; and a display unit configured to display information in response to an instruction from the processor, wherein the processor is further configured to:

estimate a temperature estimation value for the target component based on the detected temperature from the temperature sensor, power supplied to the heater, a heat capacity of the heater, and a thermal resistance of the fixing unit, control the temperature of the target component by varying the power supplied to the heater based on the estimated temperature estimation value and the target temperature, acquire a first difference between an initial detected temperature from the temperature sensor at the time of initial energization of the fixing unit and an initial temperature estimation value estimated based on the initial detected temperature, acquire a second difference between a latest detected temperature detected by the temperature sensor and a latest temperature estimation value estimated based on the latest detected temperature, and compare a temperature difference between the first difference and the second difference to a predetermined range of difference values to identify either a present necessity or a predicted necessity for maintenance of the fixing unit according to a result of the comparison between the temperature difference and the predetermined range.

2. The image forming apparatus according to claim 1, wherein the processor is configured to:

set the predetermined range to include a first predetermined range for which the temperature difference is 10° C. or higher but less than 20° C. and a second predetermined range in which the temperature difference is 20° C. or higher;

output, to the display unit, information to request checking of an inside of the fixing unit if the temperature difference between the first difference and the second difference is within the first predetermined range;

output, to the display unit, information predicting a required maintenance time for the fixing unit if the temperature difference between the first difference and the second difference is within the first predetermined range and the temperature difference occurs continuously for a set number of days or more; and output, to the display unit, information to request execution of maintenance for the fixing unit if the temperature difference between the first difference and the second difference is within the second predetermined range.

3. The image forming apparatus according to claim 2, wherein the information to request the checking of the inside of the fixing unit indicates foreign matter may be interposed between the target component and the temperature sensor.

4. The image forming apparatus according to claim 2, wherein the information to request the execution of maintenance is a request to notify a maintenance person or service.

5. The image forming apparatus according to claim 1, wherein the processor is configured to cancel execution of the comparing of the temperature difference between the first difference and the second difference to the predetermined range if an input voltage of power input to the image forming apparatus is outside an allowable range.

6. The image forming apparatus according to claim 1, wherein the processor is further configured to output, to the display unit, information indicating that foreign matter is between the target component and the temperature sensor when the temperature difference is outside the predetermined range.

7. The image forming apparatus according to claim 6, wherein the processor is further configured to output, to the display unit, information predicting a required maintenance for the fixing unit if the temperature difference is inside the predetermined range for a fixed number of days in a row.

8. The image forming apparatus according to claim 1, wherein the processor is configured to:

set the predetermined range to include a first predetermined range for which the temperature difference is 10° C. or higher but less than 20° C. and a second predetermined range in which the temperature difference is 20° C. or higher;

output, to the display unit, information to request checking of an inside of the fixing unit if the temperature difference between the first difference and the second difference is within the first predetermined range; and output, to the display unit, information to request execution of maintenance for the fixing unit if the temperature difference between the first difference and the second difference is within the second predetermined range.

9. The image forming apparatus according to claim 1, wherein the target component is a heated roller that contacts a toner image forms on a sheet.

10. The image forming apparatus according to claim 1, wherein the heater is a lamp.

11. A control method for an image forming apparatus, the control method comprising:

estimating a temperature estimation value for a target component of a fixing unit based on a detected temperature from a temperature sensor, power supplied to a heater, a heat capacity of the heater, and a thermal resistance of the fixing unit;

controlling the temperature of the target component by varying the power supplied to the heater based on the estimated temperature estimation value and the target temperature;

acquiring a first difference between an initial detected temperature from the temperature sensor at the time of initial energization of the fixing unit and an initial temperature estimation value estimated based on the initial detected temperature;

acquiring a second difference between a latest detected temperature detected by the temperature sensor and a latest temperature estimation value estimated based on the latest detected temperature; and comparing a temperature difference between the first difference and the second difference to a predetermined range of difference values to identify either a present necessity or a predicted necessity for maintenance of the fixing unit according to a result of the comparison between the temperature difference and the predetermined range.

12. The control method according to claim 11, further comprising:

setting the predetermined range to include a first predetermined range for which the temperature difference is 10° C. or higher but less than 20° C. and a second predetermined range in which the temperature difference is 20° C. or higher;

outputting, to a display unit, information to request checking of an inside of the fixing unit if the temperature difference between the first difference and the second difference is within the first predetermined range;

outputting, to the display unit, information predicting a required maintenance time for the fixing unit if the temperature difference between the first difference and the second difference is within the first predetermined range and the temperature difference occurs continuously for a set number of days or more; and outputting, to the display unit, information to request execution of maintenance for the fixing unit if the temperature difference between the first difference and the second difference is within the second predetermined range.

13. The control method according to claim 12, wherein the information to request the checking of the inside of the fixing unit indicates foreign matter may be interposed between the target component and the temperature sensor.

14. The control method according to claim 12, wherein the information to request the execution of maintenance is a request to notify a maintenance person or service.

15. The control method according to claim 11, further comprising:

cancelling execution of the comparing of the temperature difference between the first difference and the second difference to the predetermined range if an input voltage of power input to the image forming apparatus is outside an allowable range.

16. The control method according to claim 11, further comprising:

outputting, to the display unit, information indicating that foreign matter is between the temperature control target and the temperature sensor when the temperature difference is outside the predetermined range.

17. The control method according to claim 16, further comprising:

outputting, to the display unit, information predicting a required maintenance for the fixing unit if the temperature difference is inside the predetermined range for a fixed number of days in a row.

18. The control method according to claim 11, wherein the target component is a heated roller that contacts a toner image forms on a sheet.

19. The control method according to claim 11, wherein the heater is a lamp.

* * * * *